United States Patent
Song et al.

(10) Patent No.: US 12,086,821 B2
(45) Date of Patent: Sep. 10, 2024

(54) METHOD, SYSTEM, AND COMPUTER PROGRAM PRODUCT FOR PREDICTING FUTURE TRANSACTIONS

(71) Applicant: Visa International Service Association, San Francisco, CA (US)

(72) Inventors: Hongqin Song, Austin, TX (US); William Joseph Leddy, III, Lakeway, TX (US); Yu Gu, Austin, TX (US); Gary Denitus Dougan, Los Gatos, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/568,833

(22) Filed: Jan. 5, 2022

(65) Prior Publication Data

US 2022/0129929 A1    Apr. 28, 2022

Related U.S. Application Data (63) Continuation of application No. 16/548,064, filed on Aug. 22, 2019, now Pat. No. 11,244,333.

(51) Int. Cl.
| | |
|---|---|
| *G06Q 30/02* | (2023.01) |
| *G06Q 30/0204* | (2023.01) |
| *G06Q 20/20* | (2012.01) |

(52) U.S. Cl.
CPC ........ *G06Q 30/0205* (2013.01); *G06Q 20/20* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 10,922,712 B1 * | 2/2021 | Langdon | ............ G06Q 30/0205 |
| 2014/0304212 A1 | 10/2014 | Shim et al. | |
| 2014/0326783 A1 * | 11/2014 | Burrell | ................... G06Q 30/01 |
| | | | 235/375 |

(Continued)

FOREIGN PATENT DOCUMENTS

WO    WO-2019083714 A1 *    5/2019    ....... G06F 16/24578

OTHER PUBLICATIONS

Igor V. Cadez, Padhraic Smyth, Edward Ip and Heikki Mannila, Predictive Profiles for Transaction Data using Finite Mixture Models, Technical Report No. 01-67, Information and Computer Science Department, University of California, Irvine, 2002. (Year: 2002).*

(Continued)

*Primary Examiner* — Kurtis Gills
(74) *Attorney, Agent, or Firm* — The Webb Law Firm (57) ABSTRACT

A method, system, and computer program product for predicting future transactions may obtain merchant data associated with a merchant; determine a geographic location associated with the merchant based on the merchant data; determine one or more other merchants within a first threshold distance of the geographic location; obtain transaction data associated with the one or more other merchants and the merchant; and predict, based on the transaction data, at least one of a future number of transactions for the merchant in a future time period and a future transaction amount for the merchant in the future time period.

9 Claims, 4 Drawing Sheets

(56) References Cited

U.S. PATENT DOCUMENTS

| | | | |
|---|---|---|---|
| 2015/0227934 A1* | 8/2015 | Chauhan | G06Q 20/3224 |
| | | | 705/44 |
| 2015/0264532 A1* | 9/2015 | Spears | H04W 4/029 |
| | | | 455/456.3 |
| 2016/0117705 A1 | 4/2016 | Robinson et al. | |
| 2016/0328610 A1 | 11/2016 | Thompson et al. | |
| 2016/0364489 A1* | 12/2016 | Gupta | G06F 16/9535 |
| 2017/0116679 A1 | 4/2017 | Abraham et al. | |
| 2017/0262784 A1* | 9/2017 | Lowery | G06Q 50/12 |
| 2017/0300948 A1* | 10/2017 | Chauhan | G06Q 10/087 |
| 2019/0287125 A1* | 9/2019 | Kumar | G06Q 30/0631 |

OTHER PUBLICATIONS

Friedman, "Greedy Function Approximation: A Gradient Boosting Machine", The Annals of Statistics, 2001, 39 pages.

Gupta et al., "Training Highly Multiclass Classifiers", Journal of Machine Learning Research, Apr. 2014, pp. 1461-1492.

Li et al., "Predicting Home and Work Locations Using Transport Smart Card Data by Spectral Analysis", 2015 IEEE 18th International Conference on Intelligent Transportation Systems, 2015, pp. 2788-2793.

Mahmud et al., "Home Location Identification of Twitter Users", ACM Transactions on Intelligent Systems and Technology, Jul. 2014, 21 pages, vol. 5, No. 3.

Zheng et al., "Inferring Home Location from User's Photo Collections based on Visual Content and Mobility Patterns", ACM 3rd Multimedia Workshop on Geotagging and Its Applications in Multimedia, 2014, pp. 21-26.

\* cited by examiner

METHOD, SYSTEM, AND COMPUTER PROGRAM PRODUCT FOR PREDICTING FUTURE TRANSACTIONS

CROSS-REFERENCE TO RELATED APPLICATION

This application is a continuation of U.S. patent application Ser. No. 16/548,064 filed on Aug. 22, 2019, the disclosure of which is hereby incorporated by reference in its entirety.

BACKGROUND

1. Field

This disclosure relates generally to systems, devices, products, apparatus, and methods for transaction prediction, and in some embodiments or aspects, to a method, a system, and a product for predicting future transactions using geographic locations and merchant transaction history.

2. Technical Considerations

A merchant may have access to transaction data associated with transactions initiated and/or conducted at that merchant. However, that same merchant may not have access to transaction data associated with transactions initiated and/or conducted at other merchants, such as competing merchants, nearby merchants, and/or the like. Transaction processing systems may globally process thousands of transactions per second. However, merchants cannot access this large volume of transactions over large amounts of geographic areas for making business decisions. Accordingly, there is a need in the art for improved transaction prediction.

SUMMARY

Accordingly, provided are improved systems, devices, products, apparatus, and/or methods for transaction prediction.

According to some non-limiting embodiments or aspects, provided is a computer-implemented method, including: obtaining, with at least one processor, merchant data associated with a merchant; determining, with at least one processor, a geographic location associated with the merchant based on the merchant data; determining, with at least one processor, one or more other merchants within a first threshold distance of the geographic location; obtaining, with at least one processor, transaction data associated with the one or more other merchants and the merchant; and predicting, with at least one processor, based on the transaction data, at least one of a future number of transactions for the merchant in a future time period and a future transaction amount for the merchant in the future time period.

In some non-limiting embodiments or aspects, the method further includes: determining, with at least one processor, one or more portable financial devices within a second threshold distance of the geographic location, wherein predicting the at least one of the future number of transactions for the merchant in the future time period and the future transaction amount for the merchant in the future time period is further based on the one or more portable financial devices determined to be within the second threshold distance of the geographic location.

In some non-limiting embodiments or aspects, the method further includes: determining, with at least one processor, demographic data associated with the geographic location, wherein predicting the at least one of the future number of transactions for the merchant in the future time period and the future transaction amount for the merchant in the future time period is further based on the demographic data associated with the geographic location.

In some non-limiting embodiments or aspects, the merchant is associated with a plurality of previously processed transactions having a pre-existing point-of-sale (POS) at the geographic location.

In some non-limiting embodiments or aspects, the merchant includes a proposed merchant without a point-of-sale (POS) at the geographic location.

In some non-limiting embodiments or aspects, the first threshold distance includes a radius around the geographic location.

In some non-limiting embodiments or aspects, the method further includes: applying, with at least one processor, a geo-hash to the geographic location to determine the one or more other merchants within the radius around the geolocation.

According to some non-limiting embodiments or aspects, provided is a system, including: one or more processors programmed and/or configured to: obtain merchant data associated with a merchant; determine a geographic location associated with the merchant based on the merchant data; determine one or more other merchants within a first threshold distance of the geographic location; obtain transaction data associated with the one or more other merchants and the merchant; and predict, based on the transaction data, at least one of a future number of transactions for the merchant in a future time period and a future transaction amount for the merchant in the future time period.

In some non-limiting embodiments or aspects, the one or more processors are further programmed and/or configured to: determine one or more portable financial devices within a second threshold distance of the geographic location, wherein predicting the at least one of the future number of transactions for the merchant in the future time period and the future transaction amount for the merchant in the future time period is further based on the one or more portable financial devices determined to be within the second threshold distance of the geographic location.

In some non-limiting embodiments or aspects, the one or more processors are further programmed and/or configured to: determine demographic data associated with the geographic location, wherein predicting the at least one of the future number of transactions for the merchant in the future time period and the future transaction amount for the merchant in the future time period is further based on the demographic data associated with the geographic location.

In some non-limiting embodiments or aspects, the merchant is associated with a plurality of previously processed transactions having a pre-existing point-of-sale (POS) at the geographic location.

In some non-limiting embodiments or aspects, the merchant includes a proposed merchant without a point-of-sale (POS) at the geographic location.

In some non-limiting embodiments or aspects, the first threshold distance includes a radius around the geographic location.

In some non-limiting embodiments or aspects, the one or more processors are further programmed and/or configured to: apply a geo-hash to the geographic location to determine the one or more other merchants within the radius around the geolocation.

According to some non-limiting embodiments or aspects, provided is a computer program product including at least one non-transitory computer-readable medium including program instructions that, when executed by at least one processor, cause the at least one processor to: obtain merchant data associated with a merchant; determine a geographic location associated with the merchant based on the merchant data; determine one or more other merchants within a first threshold distance of the geographic location; obtain transaction data associated with the one or more other merchants and the merchant; and predict, based on the transaction data, at least one of a future number of transactions for the merchant in a future time period and a future transaction amount for the merchant in the future time period.

In some non-limiting embodiments or aspects, the instructions further cause the at least one processor to: determine one or more portable financial devices within a second threshold distance of the geographic location, wherein predicting the at least one of the future number of transactions for the merchant in the future time period and the future transaction amount for the merchant in the future time period is further based on the one or more portable financial devices determined to be within the second threshold distance of the geographic location.

In some non-limiting embodiments or aspects, the instructions further cause the at least one processor to: determine demographic data associated with the geographic location, wherein predicting the at least one of the future number of transactions for the merchant in the future time period and the future transaction amount for the merchant in the future time period is further based on the demographic data associated with the geographic location.

In some non-limiting embodiments or aspects, the merchant is associated with a plurality of previously processed transactions having a pre-existing point-of-sale (POS) at the geographic location.

In some non-limiting embodiments or aspects, the merchant includes a proposed merchant without a point-of-sale (POS) at the geographic location.

In some non-limiting embodiments or aspects, the first threshold distance includes a radius around the geographic location, and the instructions further cause the at least one processor to: apply a geo-hash to the geographic location to determine the one or more other merchants within the radius around the geolocation.

Further embodiments or aspects are set forth in the following numbered clauses:

Clause 1. A computer-implemented method, comprising: obtaining, with at least one processor, merchant data associated with a merchant; determining, with at least one processor, a geographic location associated with the merchant based on the merchant data; determining, with at least one processor, one or more other merchants within a first threshold distance of the geographic location; obtaining, with at least one processor, transaction data associated with the one or more other merchants and the merchant; and predicting, with at least one processor, based on the transaction data, at least one of a future number of transactions for the merchant in a future time period and a future transaction amount for the merchant in the future time period.

Clause 2. The computer-implemented method of clause 1, further comprising: determining, with at least one processor, one or more portable financial devices within a second threshold distance of the geographic location, wherein predicting the at least one of the future number of transactions for the merchant in the future time period and the future transaction amount for the merchant in the future time period is further based on the one or more portable financial devices determined to be within the second threshold distance of the geographic location.

Clause 3. The computer-implemented method of clauses 1 or 2, further comprising: determining, with at least one processor, demographic data associated with the geographic location, wherein predicting the at least one of the future number of transactions for the merchant in the future time period and the future transaction amount for the merchant in the future time period is further based on the demographic data associated with the geographic location.

Clause 4. The computer-implemented method of any of clauses 1-3, wherein the merchant is associated with a plurality of previously processed transactions having a pre-existing point-of-sale (POS) at the geographic location.

Clause 5. The computer-implemented method of any of clauses 1-4, wherein the merchant includes a proposed merchant without a point-of-sale (POS) at the geographic location.

Clause 6. The computer-implemented method of any of clauses 1-5, wherein the first threshold distance includes a radius around the geographic location.

Clause 7. The computer-implemented method of any of clauses 1-6, further comprising: applying, with at least one processor, a geo-hash to the geographic location to determine the one or more other merchants within the radius around the geolocation.

Clause 8. A system, comprising: one or more processors programmed and/or configured to: obtain merchant data associated with a merchant; determine a geographic location associated with the merchant based on the merchant data; determine one or more other merchants within a first threshold distance of the geographic location; obtain transaction data associated with the one or more other merchants and the merchant; and predict, based on the transaction data, at least one of a future number of transactions for the merchant in a future time period and a future transaction amount for the merchant in the future time period.

Clause 9. The system of clause 8, wherein the one or more processors are further programmed and/or configured to: determine one or more portable financial devices within a second threshold distance of the geographic location, wherein predicting the at least one of the future number of transactions for the merchant in the future time period and the future transaction amount for the merchant in the future time period is further based on the one or more portable financial devices determined to be within the second threshold distance of the geographic location.

Clause 10. The system of clauses 8 or 9, wherein the one or more processors are further programmed and/or configured to: determine demographic data associated with the geographic location, wherein predicting the at least one of the future number of transactions for the merchant in the future time period and the future transaction amount for the merchant in the future time period is further based on the demographic data associated with the geographic location.

Clause 11. The system of any of clauses 8-10, wherein the merchant is associated with a plurality of previously processed transactions having a pre-existing point-of-sale (POS) at the geographic location.

Clause 12. The system of any of clauses 8-11, wherein the merchant includes a proposed merchant without a point-of-sale (POS) at the geographic location.

Clause 13. The system of any of clauses 8-12, wherein the first threshold distance includes a radius around the geographic location.

Clause 14. The system of any of clauses 8-13, wherein the one or more processors are further programmed and/or configured to: apply a geo-hash to the geographic location to determine the one or more other merchants within the radius around the geolocation.

Clause 15. A computer program product comprising at least one non-transitory computer-readable medium including program instructions that, when executed by at least one processor, cause the at least one processor to: obtain merchant data associated with a merchant; determine a geographic location associated with the merchant based on the merchant data; determine one or more other merchants within a first threshold distance of the geographic location; obtain transaction data associated with the one or more other merchants and the merchant; and predict, based on the transaction data, at least one of a future number of transactions for the merchant in a future time period and a future transaction amount for the merchant in the future time period.

Clause 16. The computer program product of clause 15, wherein the instructions further cause the at least one processor to: determine one or more portable financial devices within a second threshold distance of the geographic location, wherein predicting the at least one of the future number of transactions for the merchant in the future time period and the future transaction amount for the merchant in the future time period is further based on the one or more portable financial devices determined to be within the second threshold distance of the geographic location.

Clause 17. The computer program product of clauses 15 or 16, wherein the instructions further cause the at least one processor to: determine demographic data associated with the geographic location, wherein predicting the at least one of the future number of transactions for the merchant in the future time period and the future transaction amount for the merchant in the future time period is further based on the demographic data associated with the geographic location.

Clause 18. The computer program product of any of clauses 15-17, wherein the merchant is associated with a plurality of previously processed transactions having a pre-existing point-of-sale (POS) at the geographic location.

Clause 19. The computer program product of any of clauses 16-18, wherein the merchant includes a proposed merchant without a point-of-sale (POS) at the geographic location.

Clause 20. The computer program product of any of clauses 15-19, wherein the first threshold distance includes a radius around the geographic location, and wherein the instructions further cause the at least one processor to: apply a geo-hash to the geographic location to determine the one or more other merchants within the radius around the geolocation.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" or "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatus, and/or methods for predicting future transactions.

Non-limiting embodiments or aspects of the present disclosure are directed to systems, methods, and computer program products for predicting future transactions that obtain merchant data associated with a merchant; determine a geographic location associated with the merchant based on the merchant data; determine one or more other merchants within a first threshold distance of the geographic location; obtain transaction data associated with the one or more other merchants and the merchant; and predict, based on the transaction data, at least one of a future number of transactions for the merchant in a future time period and a future transaction amount for the merchant in the future time period. In this way, non-limiting embodiments or aspects of the present disclosure may provide for predicting future transactions more quickly (e.g., in real-time, during processing of one or more other transactions associated with a merchant in a transaction processing network, etc.), which enables determining risk associated with a merchant operating at a specific location at a specific time and making just-in-time business decisions based thereon.

Figure 1A:
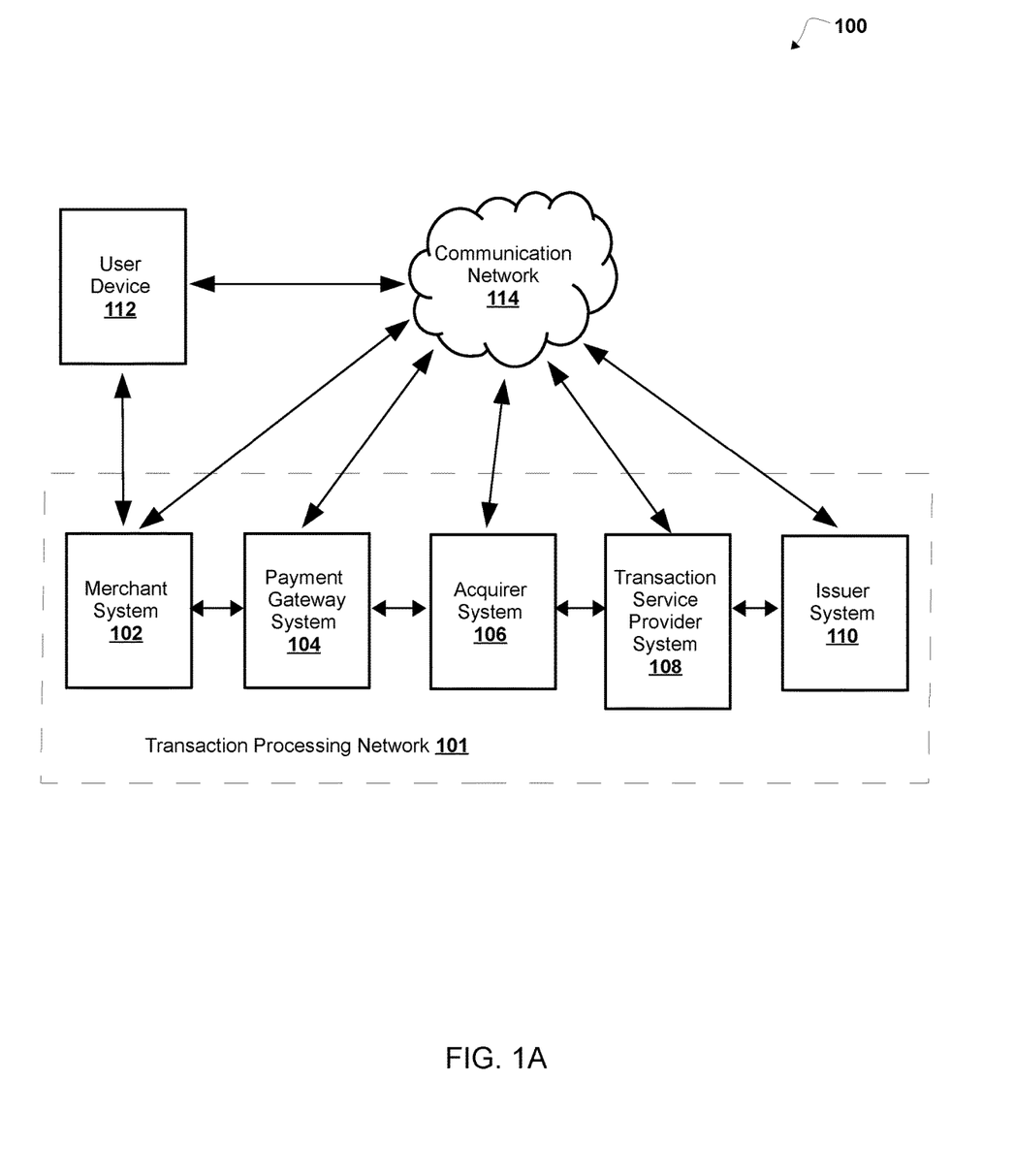
FIG. 1A is a diagram of non-limiting embodiments or aspects of an environment in which systems, devices, products, apparatus, and/or methods, described herein, may be implemented.

Referring now to FIG. 1A, FIG. 1A is a diagram of an example environment 100 in which devices, systems, methods, and/or products described herein, may be implemented. As shown in FIG. 1A, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 114, etc.) and/or communicating information and/or data to payment gateway system 104, acquirer system 106, transaction service provider system 108, issuer system 110, and/or user device 112 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 114, etc.) and/or communicating information and/or data to merchant system 102, acquirer system 106, transaction service provider system 108, issuer system 110, and/or user device 112 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 114, etc.) and/or communicating information and/or data to merchant system 102, payment gateway system 104, acquirer system 106, issuer system 110, and/or user device 112 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including account data, transaction data, merchant data, demographic data, and/or the like.

Issuer system 110 may include one or more devices capable of receiving information and/or data from merchant system 102, payment gateway system 104, acquirer system 106, transaction service provider system 108, and/or user device 112 (e.g., via communication network 114, etc.) and/or communicating information and/or data to merchant system 102, payment gateway system 104, acquirer system 106, transaction service provider system 108, and/or user device 112 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 may include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 may process (e.g., initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 114, etc.) and/or communicating information and/or data to merchant system 102, payment gateway system 104, acquirer system 106, transaction service provider system 108, and/or issuer system 110 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 1B:
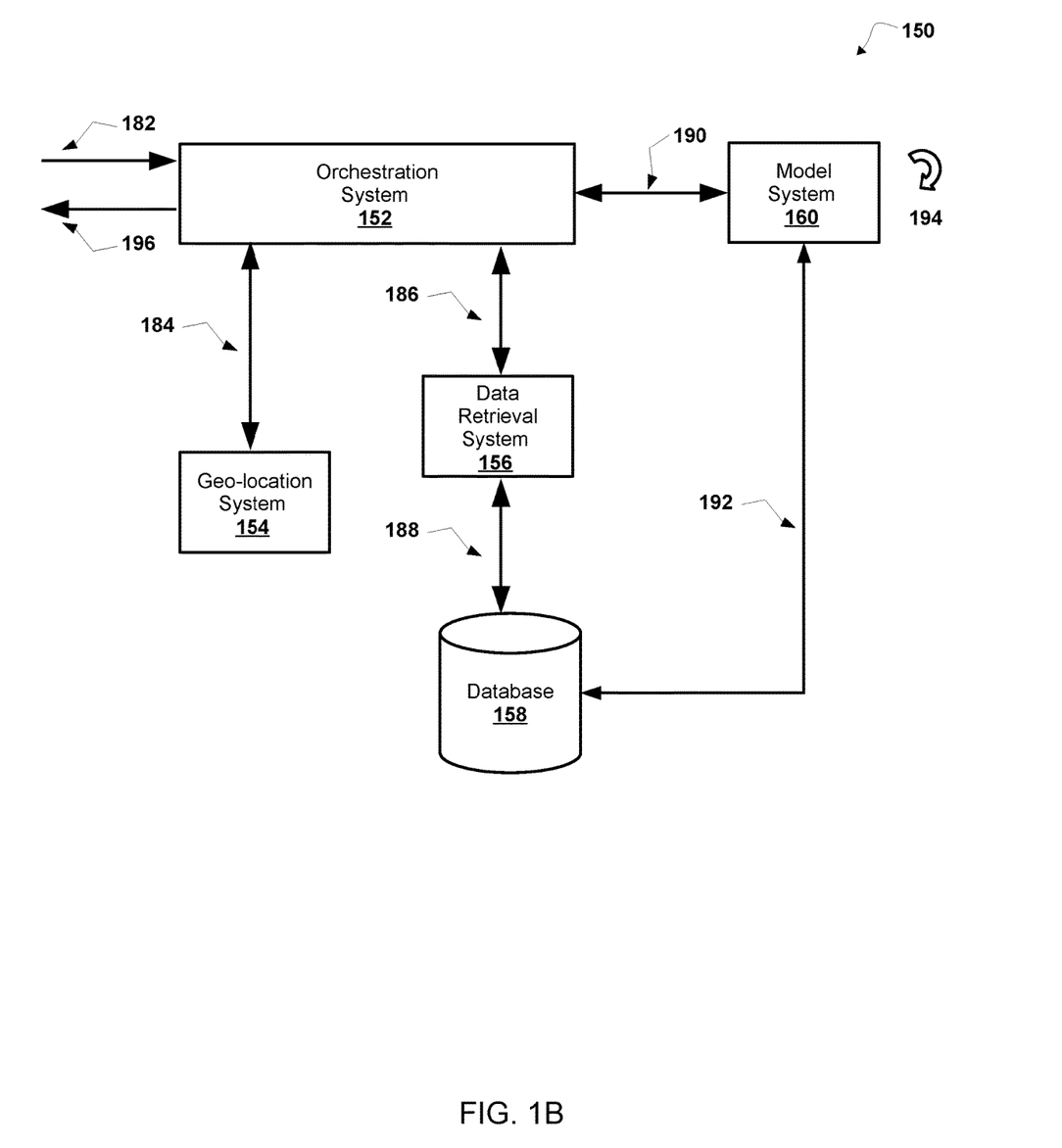
FIG. 1B is a diagram of non-limiting embodiments or aspects of a system for predicting future transactions.

Referring now to FIG. 1B, FIG. 1B is a diagram of non-limiting embodiments or aspects of a system 150 for predicting future transactions. System 150 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114. As shown in FIG. 1B, system 150 includes orchestration system 152, geolocation system 154, data retrieval system 156, database 158, and/or model system 160. Orchestration system 152, geolocation system 154, data retrieval system 156, database 158, and/or model system 160 may be implemented within a single device and/or system or distributed across multiple devices and/or systems. System 150 may be configured to predict future transactions and is described in more detail herein below with respect to FIG. 3 which discloses a process therefor.

The number and arrangement of devices and systems shown in FIGS. 1A and 1B is provided as an example. There may be additional devices and/or systems, fewer devices and/or systems, different devices and/or systems, or differently arranged devices and/or systems than those shown in FIGS. 1A and 1B. Furthermore, two or more devices and/or systems shown in FIGS. 1A and 1B may be implemented within a single device and/or system, or a single device and/or system shown in FIGS. 1A and 1B may be implemented as multiple, distributed devices and/or systems. Additionally or alternatively, a set of devices and/or systems (e.g., one or more devices or systems) of environment 100 may perform one or more functions described as being performed by another set of devices or systems of environment 100.

Figure 2:
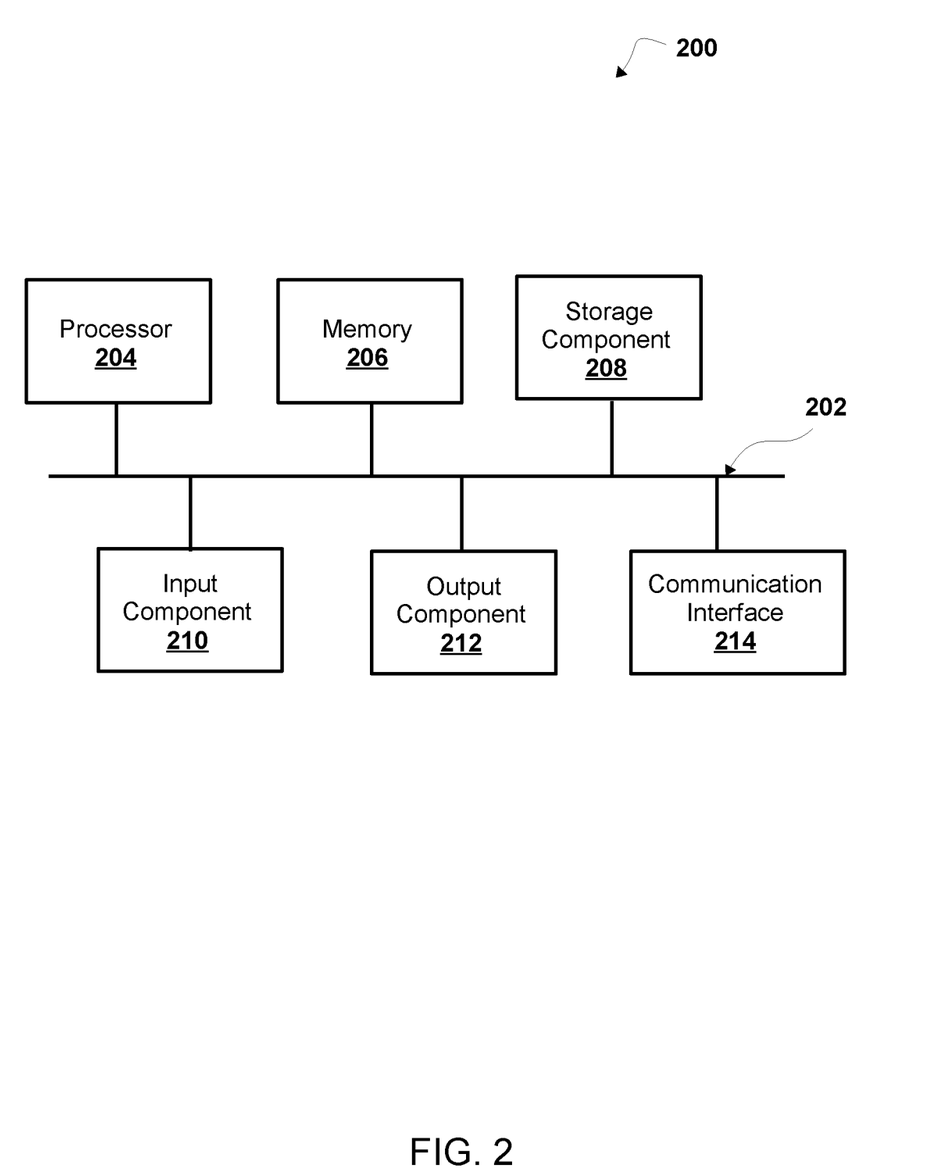
FIG. 2 is a diagram of non-limiting embodiments or aspects of components of one or more devices and/or one or more systems of FIGS. 1A and 1B.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208. For example, transaction service provider system 108 may include and/or access one or more internal and/or external databases that store transaction data associated with transactions processed and/or being processed in transaction processing network 101 (e.g., prior or historical transactions processed via transaction service provider system 108, etc.), account data, request data, and/or the like.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
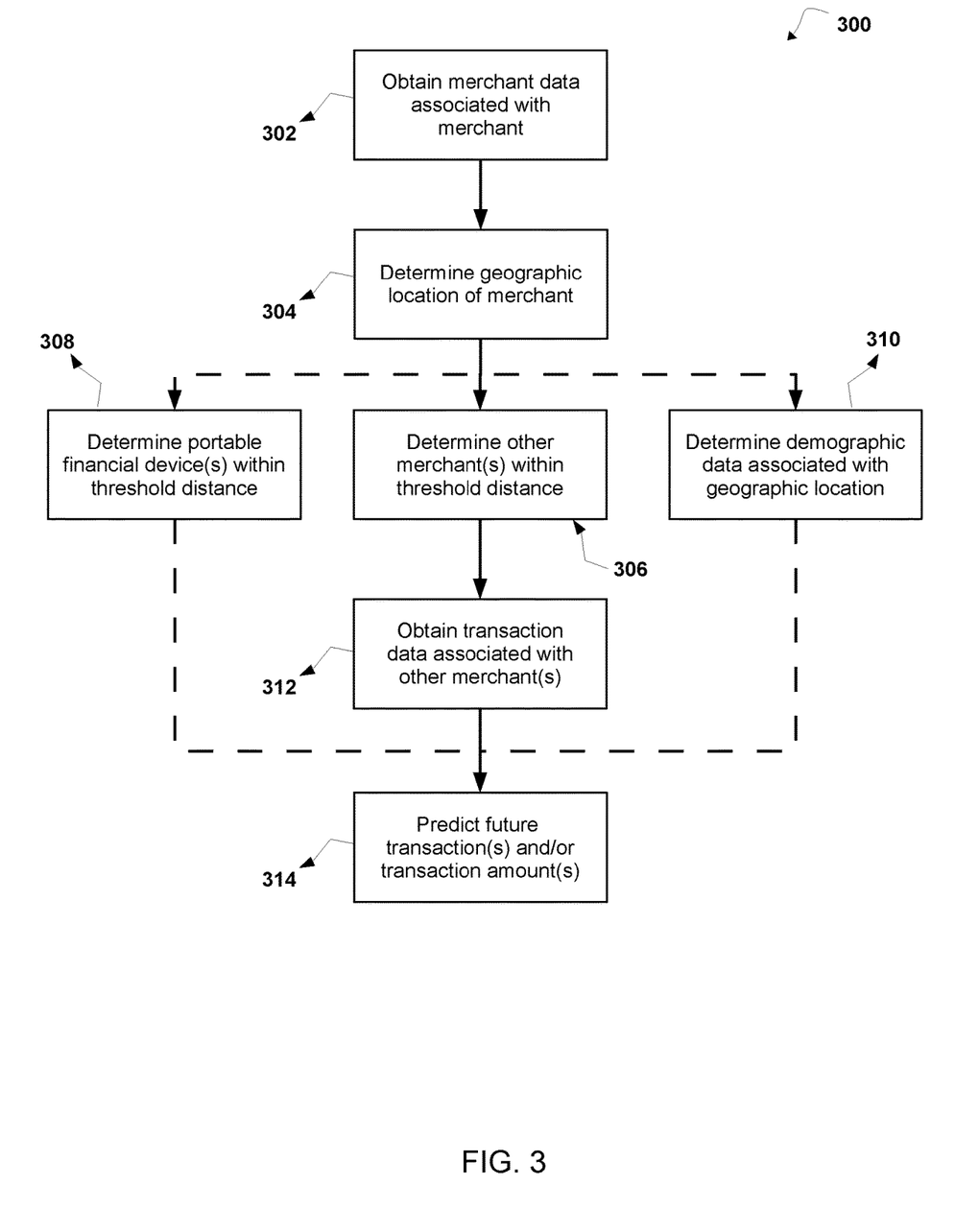
FIG. 3 is a flowchart of non-limiting embodiments or aspects of a process for predicting future transactions.

Referring now to FIG. 3, FIG. 3 is a flowchart of non-limiting embodiments or aspects of a process 300 for predicting future transactions. In some non-limiting embodiments or aspects, one or more of the steps of process 300 may be performed (e.g., completely, partially, etc.) by transaction service provider system 108 (e.g., one or more devices of transaction service provider system 108). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes obtaining merchant data associated with a merchant. For example, transaction service provider system 108 may obtain merchant data associated with a merchant. As an example, the merchant may be associated with merchant system 102.

In some non-limiting embodiments or aspects, merchant data may include an address or other location associated with a merchant, a merchant type, a merchant name, a merchant location, and/or the like. For example, and referring also to FIG. 1B, at reference number 182, orchestration system 152 of may receive a prediction request associated with a merchant (e.g., a request for a number of transactions predicted for the merchant in a future time period, a request for a future transaction amount for the merchant in the future time period, etc.). For example, a future time period may include a particular day, a particular time of day, a particular week, a particular month, and/or the like. As an example, the prediction request may include a merchant name and/or an address of the merchant. In such an example, the address of the merchant may be a current address of a location (e.g., a brick and mortar location, etc.) of the merchant or a proposed address for a proposed location of the merchant (e.g., a proposed brick and mortar location at which the merchant does not currently have a presence or store, etc.).

As shown in FIG. 3, at step 304, process 300 includes determining a geographic location associated with a merchant. For example, transaction service provider system 108 may determine a geographic location associated with the merchant based on the merchant data associated with the merchant. As an example, at reference number 184, orchestration system 152 may call geographic location system 154 to normalize an address of the merchant to determine a latitude and a longitude of the geographic location associated with the merchant.

In some non-limiting embodiments or aspects, a merchant is associated with a plurality of previously processed transactions having a pre-existing point-of-sale (POS) at a geographic location (e.g., a pre-existing brick and mortar location, etc.). In some non-limiting embodiments or aspects, a merchant may include a proposed merchant (e.g., a proposed merchant location, etc.) without a point-of-sale (POS) at the geographic location (e.g., a proposed brick and mortar location at which the merchant does not currently have a presence or store, etc.).

As shown in FIG. 3, at step 306, process 300 includes determining one or more other merchants within a first threshold distance. For example, transaction service provider system 108 may determine one or more other merchants within a first threshold distance of the geographic location.

As shown in FIG. 3, at step 308, process 300 includes determining one or more portable financial devices within a second threshold distance. For example, transaction service provider system 108 may determine one or more portable financial devices within a second threshold distance of the geographic location.

In some non-limiting embodiments or aspects, the first threshold distance may be the same as the second threshold distance. In some non-limiting embodiments or aspects, the first threshold distance may be different than the second threshold distance. In some non-limiting embodiments or aspects, a threshold (e.g., the first threshold, the second threshold, etc.) may include a radius around or surrounding the geographic location associated with the merchant (e.g., a radius around a specific geographic point, such as a latitude and longitude point, and/or the like).

In some non-limiting embodiments or aspects, transaction service provider system 108 may determine one or more locations associated with one or more portable financial devices as described in International Application No. PCT/US2018/019308, filed on Feb. 23, 2019, the entire contents of which is hereby incorporated by reference. For example, transaction service provider system 108 may use the one or more locations associated with the one or more portable financial devices to determine whether the one or more portable financial devices are within the second threshold distance of the geographic location associated with the merchant.

In some non-limiting embodiments or aspects, transaction service provider system 108 may apply a geo-hash to a geographic location associated with a merchant to determine the one or more other merchants and/or the one or more portable financial devices within the first threshold and/or the second threshold (e.g., within a radius, etc.) of the geographic location associated with the merchant. For example, transaction service provider system 108 may save a geo-merchant index as a sorted set and interleave latitude and longitude bits (e.g., geographic points, etc.) together to form a unique 52 bit integer. As an example, a geo-merchant index including a number n merchants may be represented as follows:

geo_52_bit_integer_1: merchant_id_1
geo_52_bit_integer_2: merchant_id_2
. . .
geo_52_bit_integer_n: merchant_id_n In this way, transaction service provider system 108 may use a geo-hash to determine a merchant index or list according to geographic location more quickly based on geographic points including latitude and longitude such that the geo-merchant index can be used to identify merchants within a threshold distance of the geographic location associated with the merchant in real-time (e.g., in less than 10 milliseconds, etc.).

For example, transaction service provider system 108 may save a geo-financial device (e.g., card, etc.) index as a sorted set and interleave latitude and longitude bits (e.g., geographic points, etc.) together to form a unique 52 bit integer. As an example, a geo-card index including a number n merchants may be represented as follows:

geo_52_bit_integer_1: card_num_1
geo_52_bit_integer_2: card_num_2
. . .
geo_52_bit_integer_n: card_num_n In this way, transaction service provider system 108 may use a geo-hash to determine a financial device index or list according to geographic location more quickly based on geographic points including latitude and longitude such that the geo-merchant index can be used to identify merchants within a threshold distance of the geographic location associated with the merchant in real-time (e.g., in less than 10 milliseconds, etc.).

As shown in FIG. 3, at step 310, process 300 includes determining demographic data associated with a geographic location. For example, transaction service provider system 108 may determine demographic data associated with the geographic location. In some non-limiting embodiments or aspects, steps 306, 308, and 310 may be performed concurrently. In some non-limiting embodiments or aspects, only step 306 of steps 306, 308, and 310 may be performed, only steps 306 and 308 of steps 306, 308, and 310 may be performed, or only steps 306 and 310 of steps 306, 308, and 310 may be performed.

In some non-limiting embodiments or aspects, demographic data may include one or more parameters associated with demographics of a geographic location (e.g., a geographic location or area within the first threshold distance and/or the second threshold distance of the geographic location associated with the merchant, etc.), such as an amount (e.g., a percentage, etc.) of usage of portable financial devices for transactions initiated and/or conducted in the area, as an amount (e.g., a percentage, etc.) of usage of portable financial devices for transactions of a particular type or merchant category classification (MCC) code initiated and/or conducted in the area, an average population of the geographic location within the first threshold distance and/or the second threshold distance of the geographic location associated with the merchant, an average age of the population, an average income of the population, and/or any other statistical data relation to the population within the first threshold distance and/or the second threshold distance of the geographic location associated with the merchant.

As shown in FIG. 3, at step 312, process 300 includes obtaining transaction data associated with one or more other merchants. For example, transaction service provider system 108 may obtain transaction data associated with the one or more other merchants and the merchant. As an example, and referring again to FIG. 1B, at reference number 186, orchestration system 152 may call data retrieval system 156 and, at reference number 188, data retrieval system 156 may call database 158 (e.g., a NoSQL Repository, etc.) to retrieve the transaction data associated with the one or more other merchants (and/or data associated with one or more portable financial devices, demographic data, etc.).

In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a transaction approval (and/or decline) rate, and/or the like.

In some non-limiting embodiments or aspects, transaction service provider system 108 (e.g., data retrieval system 156, etc.) builds a merchant-transaction index. For example, transaction service provider system 108 may build the merchant-transaction index on a sorted set using a rolling sum for more quickly calculating aggregations. As an example, a sample merchant-transaction index associated with a merchant identified by merchant_id1 may be represented according to the format Merchant_ID:Timestamp:Transaction#:Transaction Amount as follows:

Merchant_id1:Timestamp1:28:654.23
Merchant_id1:Timestamp2:38:1254.56
. . .
Merchant_id1:TimestampN:58:2254.79

In such an example, for Merchant_id1 between timestamp1 and timestampN, a number of transactions is 58−28=30, and a transaction amount (e.g., a total transaction amount, etc.) is 2254.79−654.23=1600.56. For example, transaction service provider system 108 (e.g., data retrieval system 156, etc.) may aggregate transaction data for merchants in a batch mode (e.g., retrieve aggregation data for 200 merchants for each call, etc.).

As shown in FIG. 3, at step 314, process 300 includes predicting at least one of a future number of transactions for a merchant in a future time period and a future transaction amount for the merchant in the future time period. For example, transaction service provider system 108 may predict, based on the transaction data, at least one of a future number of transactions for the merchant in a future time period and a future transaction amount for the merchant in the future time period. As an example, and referring again to FIG. 1B, at reference number 190, orchestration system 152 may call model system 160 and, in response thereto, model system 160 may, at reference number 192, load a model and model state (e.g., from database 158, etc.) and the data retrieved by data retrieval system 156 (e.g., transaction data associated with the one or more other merchants and the merchant, data (e.g., account data, transaction data, etc.) associated with the one or more portable financial devices determined to be within the second threshold distance of the geographic location, and/or demographic data, etc.).

In some non-limiting embodiments or aspects, predicting the at least one of the future number of transactions for the merchant in the future time period and the future transaction amount for the merchant in the future time period is further based on the one or more portable financial devices determined to be within the second threshold distance of the geographic location. In some non-limiting embodiments or aspects, predicting the at least one of the future number of transactions for the merchant in the future time period and the future transaction amount for the merchant in the future time period is further based on the demographic data associated with the geographic location.

In some non-limiting embodiments or aspects, transaction service provider system 108 may process, using one or more machine learning models, (e.g., a TensorFlow model, an autoregressive integrated moving average (ARIMA) model, etc.) the transaction data associated with the one or more other merchants and the merchant, data (e.g., account data, transaction data, etc.) associated with the one or more portable financial devices determined to be within the second threshold distance of the geographic location, and/or the demographic data to predict the at least one of a future number of transactions for a merchant in a future time period and a future transaction amount for the merchant in the future time period. For example, transaction service provider system 108 may train the one or more machine learning models using historical transaction data associated with historical transaction, data associated with historical locations of portable financial devices, and historical demographic data to generate the one or more machine learning models. As an example, and referring again to FIG. 1B, at reference number 194, model system 160 may provide, as input, the transaction data associated with the one or more other merchants and the merchant, data (e.g., account data, transaction data, etc.) associated with the one or more portable financial devices determined to be within the second threshold distance of the geographic location, and/or the demographic data to the one or more machine learning models, and receive, as output from the one or more machine learning models, a prediction (e.g., a score, a probability, a likelihood, etc.) of the at least one of a future number of transactions for the merchant in a future time period and a future transaction amount for the merchant in the future time period. As shown in reference number 196, orchestration system 152 may receive a result of the prediction from model system 160 and provide the result (e.g., to a merchant, a merchant system, etc.).

In some non-limiting embodiments or aspects, transaction service provider system 108 may determine a machine learning model from a plurality of machine learning models to use for the prediction based on the merchant data associated with the merchant. For example, at reference number 192, model system 160 may determine and load a model from database 158 prediction based on the merchant data associated with the merchant. As an example, transaction service provider system 108 may determine a machine learning model from a plurality of machine learning models according to a type of products and/or services associated with a merchant. In some non-limiting embodiments or aspects, a type of products and/or services associated with a merchant may include MCC codes. MCC is used to classify a merchant by the type of products or services the merchant provides. MCC codes can be assigned by merchant type, (e.g., one for hotels, one for office supply stores, one for coffee merchants, etc.), or by merchant name (e.g., 3000 for United Airlines).

In some non-limiting embodiments or aspects, transaction service provider system 108 may determine a machine learning model from a plurality of machine learning models to use for the prediction based on the geographic location associated with the merchant. For example, at reference number 192, model system 160 may determine and load a model from database 158 prediction based on the geographic location associated with the merchant. As an example, transaction service provider system 108 may determine a machine learning model from a plurality of machine learning models according to the geographic location associated with a merchant (e.g., different geographic locations may be associated with different machine learning models by model system 160, etc.).

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
    obtaining, with at least one processor, merchant data associated with a merchant;
    determining, with at least one processor, a geographic location associated with the merchant based on the merchant data, wherein the geographic location includes latitude bits associated with a latitude of the geographic location and longitude bits associated with a longitude of the geographic location;
    determining, with at least one processor, one or more other merchants within a first threshold distance of the geographic location, wherein the first threshold distance includes a radius around the geographic location;
    building, with at least one processor, based on transaction data associated with the one or more other merchants and the merchant, a merchant-transaction index on a sorted set sorted according to transaction timestamps using a rolling sum for more quickly calculating aggregations of numbers of transactions and transaction amounts;
    retrieving, with at least one processor, from the merchant-transaction index, the transaction data associated with the one or more other merchants and the merchant including an aggregated number of transactions and an aggregated transaction amount associated with the one or more other merchants and the merchant;
    determining, with at least one processor, one or more portable financial devices within a second threshold distance of the geographic location;
    determining, with at least one processor, demographic data associated with the geographic location including at least one of: (i) a percentage of usage of portable financial devices for transactions initiated and/or conducted in the geographic location and (ii) a percentage of usage of portable financial devices for transactions of a particular merchant category classification (MCC) code initiated and/or conducted in the area;
    predicting, with at least one processor, based on the transaction data including the aggregated number of transactions and the aggregated transaction amount associated with the one or more other merchants and the merchant, the one or more portable financial devices determined to be within the second threshold distance of the geographic location, and the at least one of: (i) a percentage of usage of portable financial devices for transactions initiated and/or conducted in the geographic location and (ii) a percentage of usage of portable financial devices for transactions of a particular merchant category classification (MCC) code initiated and/or conducted in the area, at least one of a future number of transactions for the merchant in a future time period and a future transaction amount for the merchant in the future time period; and
    applying, with at least one processor, a geo-hash to the geographic location to determine the one or more portable financial devices within the second threshold distance of the geographic location by:
        interleaving the latitude bits and the longitude bits together to form a unique integer associated with the merchant;
        storing the unique integer associated with the merchant in a sorted set including one or more other unique integers associated with the one or more portable financial devices; and
        determining, based on the sorted set including the unique integer associated with the merchant and the one or more other unique integers associated with the one or more portable financial devices, the one or more portable financial devices within the second threshold distance of the geographic location.

2. The computer-implemented method of claim 1, wherein the merchant is associated with a plurality of previously processed transactions having a pre-existing point-of-sale (POS) at the geographic location.

3. The computer-implemented method of claim 1, wherein the merchant includes a proposed merchant without a point-of-sale (POS) at the geographic location.

4. A system, comprising:
one or more processors programmed and/or configured to:
obtain merchant data associated with a merchant;
determine a geographic location associated with the merchant based on the merchant data, wherein the geographic location includes latitude bits associated with a latitude of the geographic location and longitude bits associated with a longitude of the geographic location;
determine one or more other merchants within a first threshold distance of the geographic location, wherein the first threshold distance includes a radius around the geographic location;
build, based on transaction data associated with the one or more other merchants and the merchant, a merchant-transaction index on a sorted set sorted according to transaction timestamps using a rolling sum for more quickly calculating aggregations of numbers of transactions and transaction amounts;
retrieve, from the merchant-transaction index, the transaction data associated with the one or more other merchants and the merchant including an aggregated number of transactions and an aggregated transaction amount associated with the one or more other merchants and the merchant;
determine one or more portable financial devices within a second threshold distance of the geographic location;
determine demographic data associated with the geographic location including at least one of: (i) a percentage of usage of portable financial devices for transactions initiated and/or conducted in the geographic location and (ii) a percentage of usage of portable financial devices for transactions of a particular merchant category classification (MCC) code initiated and/or conducted in the area;
predict, based on the transaction data including the aggregated number of transactions and the aggregated transaction amount associated with the one or more other merchants and the merchant, the one or more portable financial devices determined to be within the second threshold distance of the geographic location, and the at least one of: (i) a percentage of usage of portable financial devices for transactions initiated and/or conducted in the geographic location and (ii) a percentage of usage of portable financial devices for transactions of a particular merchant category classification (MCC) code initiated and/or conducted in the area, at least one of a future number of transactions for the merchant in a future time period and a future transaction amount for the merchant in the future time period; and
apply a geo-hash to the geographic location to determine the one or more portable financial devices within the second threshold distance of the geographic location by:
interleaving the latitude bits and the longitude bits together to form a unique integer associated with the merchant;
storing the unique integer associated with the merchant in a sorted set including one or more other unique integers associated with the one or more portable financial devices; and
determining, based on the sorted set including the unique integer associated with the merchant and the one or more other unique integers associated with the one or more other unique integers associated with the one or more portable financial devices, the one or more portable financial devices within the second threshold distance of the geographic location.

5. The system of claim 4, wherein the merchant is associated with a plurality of previously processed transactions having a pre-existing point-of-sale (POS) at the geographic location.

6. The system of claim 4, wherein the merchant includes a proposed merchant without a point-of-sale (POS) at the geographic location.

7. A computer program product comprising at least one non-transitory computer-readable medium including program instructions that, when executed by at least one processor, cause the at least one processor to:
obtain merchant data associated with a merchant;
determine a geographic location associated with the merchant based on the merchant data, wherein the geographic location includes latitude bits associated with a latitude of the geographic location and longitude bits associated with a longitude of the geographic location;
determine one or more other merchants within a first threshold distance of the geographic location, wherein the first threshold distance includes a radius around the geographic location;
build, based on transaction data associated with the one or more other merchants and the merchant, a merchant-transaction index on a sorted set sorted according to transaction timestamps using a rolling sum for more quickly calculating aggregations of numbers of transactions and transaction amounts;
retrieve, from the merchant-transaction index, the transaction data associated with the one or more other merchants and the merchant including an aggregated number of transactions and an aggregated transaction amount associated with the one or more other merchants and the merchant;
determine one or more portable financial devices within a second threshold distance of the geographic location;
determine demographic data associated with the geographic location including at least one of: (i) a percentage of usage of portable financial devices for transactions initiated and/or conducted in the geographic location and (ii) a percentage of usage of portable financial devices for transactions of a particular merchant category classification (MCC) code initiated and/or conducted in the area;
predict, based on the transaction data including the aggregated number of transactions and the aggregated transaction amount associated with the one or more other merchants and the merchant, the one or more portable financial devices determined to be within the second threshold distance of the geographic location, and the at least one of: (i) a percentage of usage of portable financial devices for transactions initiated and/or conducted in the geographic location and (ii) a percentage of usage of portable financial devices for transactions of a particular merchant category classification (MCC) code initiated and/or conducted in the area, at least one of a future number of transactions for the merchant in a future time period and a future transaction amount for the merchant in the future time period; and apply a geo-hash to the geographic location to determine the one or more portable financial devices within the second threshold distance of the geographic location by:
  interleaving the latitude bits and the longitude bits together to form a unique integer associated with the merchant;
  storing the unique integer associated with the merchant in a sorted set including one or more other unique integers associated with the one or more portable financial devices; and
  determining, based on the sorted set including the unique integer associated with the merchant and the one or more other unique integers associated with the one or more portable financial devices, the one or more portable financial devices within the second threshold distance of the geographic location.

8. The computer program product of claim 7, wherein the merchant is associated with a plurality of previously processed transactions having a pre-existing point-of-sale (POS) at the geographic location.

9. The computer program product of claim 7, wherein the merchant includes a proposed merchant without a point-of-sale (POS) at the geographic location.

* * * * *